Dec. 5, 1939.     C. W. OSNER ET AL                2,182,210
                  RAILWAY BRAKE BEAM
                  Filed June 3, 1939        3 Sheets-Sheet 1
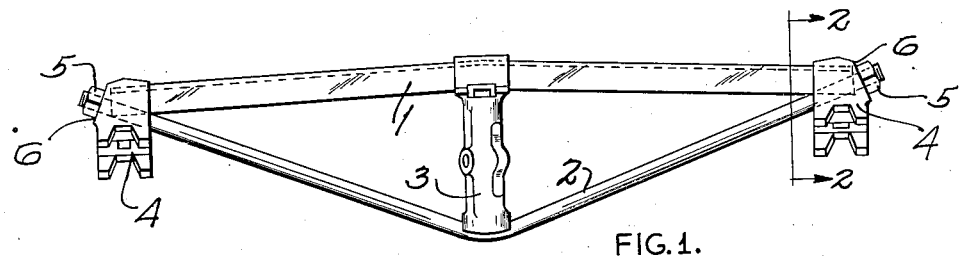
FIG. 1.
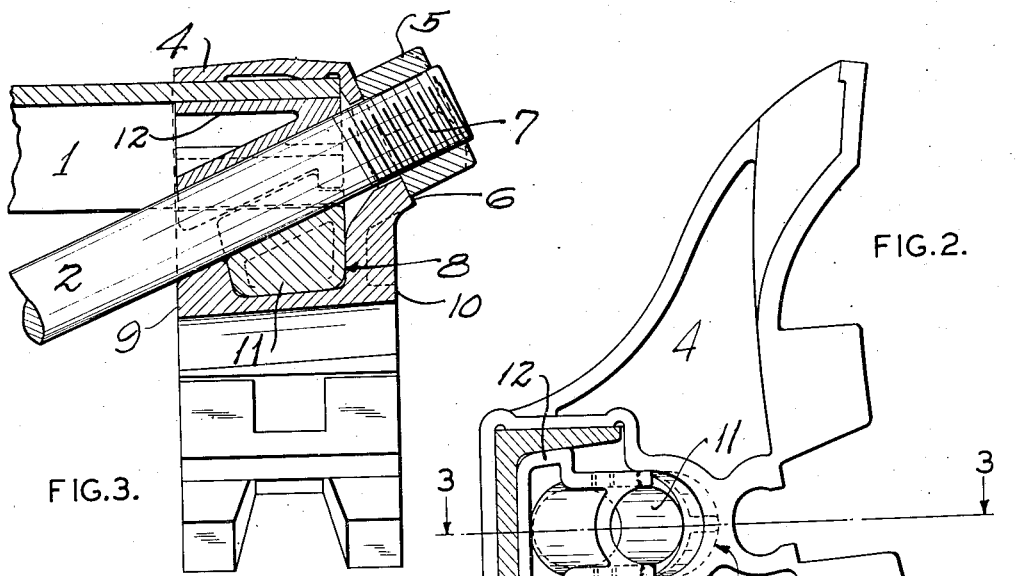
FIG. 2.
FIG. 3.
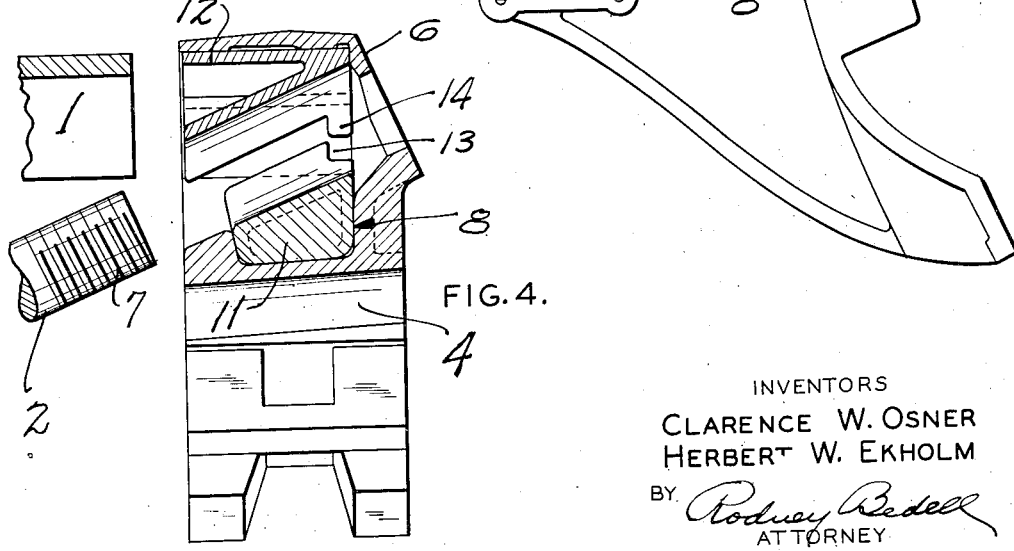
FIG. 4.
INVENTORS
CLARENCE W. OSNER
HERBERT W. EKHOLM
BY *Rodney Bedell*
ATTORNEY Dec. 5, 1939.  C. W. OSNER ET AL  2,182,210
RAILWAY BRAKE BEAM
Filed June 3, 1939  3 Sheets-Sheet 2

INVENTORS
CLARENCE W. OSNER
HERBERT W. EKHOLM
BY *Rodney Bedell*
ATTORNEY

Dec. 5, 1939.  C. W. OSNER ET AL  2,182,210
RAILWAY BRAKE BEAM
Filed June 3, 1939   3 Sheets-Sheet 3

INVENTORS
CLARENCE W. OSNER
HERBERT W. EKHOLM
BY Rodney Bedell
ATTORNEY

Patented Dec. 5, 1939

2,182,210

UNITED STATES PATENT OFFICE 2,182,210

RAILWAY BRAKE BEAM

Clarence W. Osner and Herbert W. Ekholm, Chicago, Ill., assignors to Chicago Railway Equipment Company, Chicago, Ill., a corporation of Illinois Application June 3, 1939, Serial No. 277,201

20 Claims. (Cl. 188—226)

The invention relates to railway brake beams and more particularly to beams of the truss type which include a compression member and a tension member joined at their ends and mounting brake head members, there being nuts or other tensioning devices on the ends of the tension member for holding the brake heads in place, maintaining the rigidity of the truss, etc.

Repeated application of the brake shoes to the truck wheels, and subsequent release, tends to bend the tension members adjacent to the application of the nuts or other tensioning devices and such bending will shorten the useful life of the brake beam.

The main object of the present invention is to prevent such bending of the tension member of the beam adjacent the tensioning device. Letters Patent 2,094,034 to E. G. Busse, 2,094,035 to H. W. Ekholm and 2,094,036 and 2,094,037 to L. Kadar, and application for patent by E. G. Busse, Serial No. 272,927, each discloses structure having the same general objective indicated above, and the present invention has for a more specific object the resistance of the bending of the tension member at the point indicated by using separately formed fillers insertable in the brake head or the compression member, or both. These and other detailed objects of the invention, as will be apparent from the following description, are attained by the structure illustrated in the accompanying drawings in which—

Figure 1 is a top view of a truss type brake beam embodying the invention.

Figure 2 is a transverse section taken on the line 2—2 of Figure 1 and drawn to an enlarged scale.

Figure 3 is a horizontal section taken on the line 3—3 of Figure 2.

Figure 4 corresponds to Figure 3 but shows the parts illustrated in Figure 3 in position just prior to the completion of the assembly.

Figures 5, 7, 9 and 10 correspond to Figure 3 but illustrate different forms of the invention.

Figure 6:
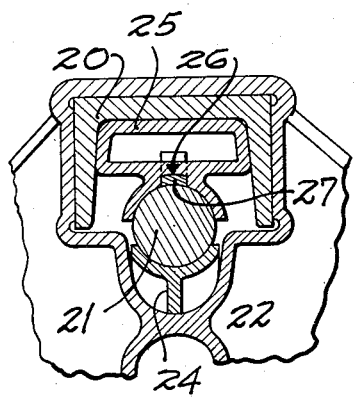
Figure 5:
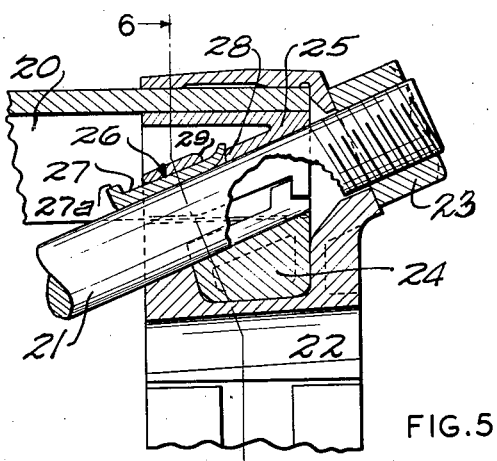
Figure 8:
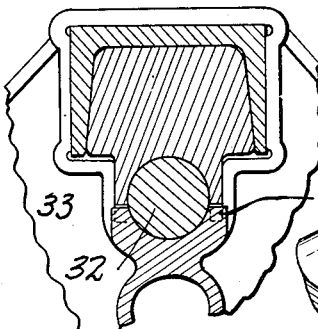
Figure 7:
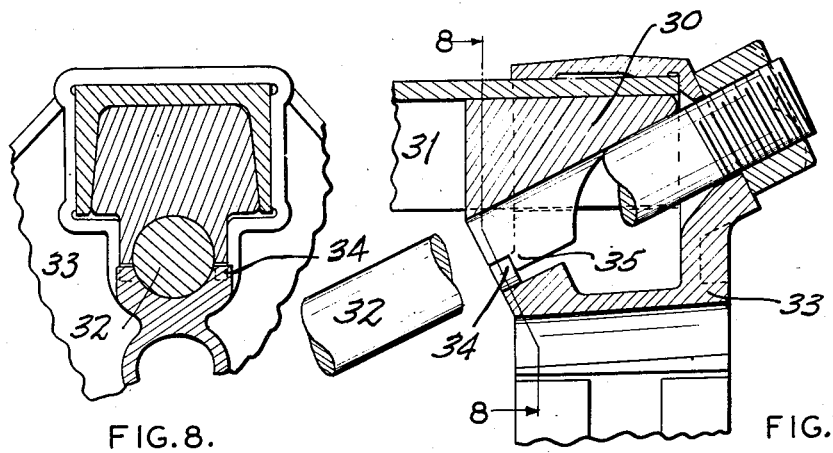
Figure 11:
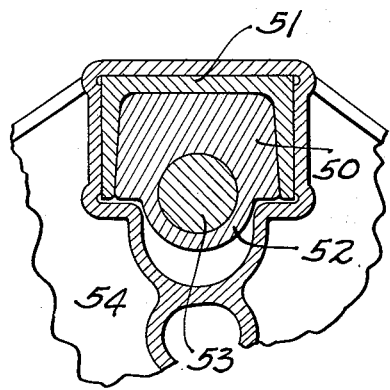
Figure 10:
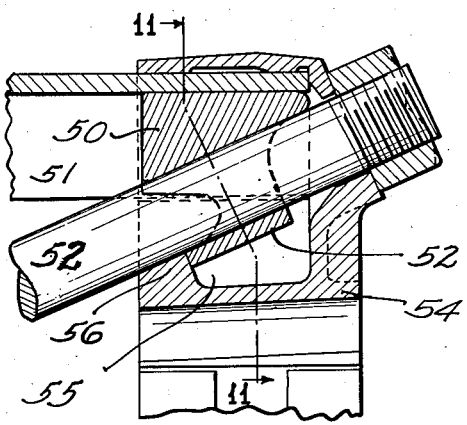

Figures 6, 8 and 11 are transverse sections taken on the corresponding section lines of Figures 5, 7 and 10 respectively.

The device shown in Figures 1 to 4 inclusive comprises a compression member of channel-like cross section 1, a round tension bar 2, a strut 3, brake heads 4 and tensioning nuts 5 seated on the inclined surfaces 6 of the brake heads and engaging the threaded end portions 7 of the tension bar. This assembly is typical of truss brake beams and in itself does not constitute the present invention.

The brake head is provided with a pocket 8 between the inner and outer sides 9 and 10 respectively of the head and pocket 8 opens towards the compression member 1. A filler 11 has an outer contour fitting in pocket 8 and an inner contour adapting it to engage and partially surround a portion of the tension bar extending across the open side of the pocket. Another filler 12 has an outer contour adapting it to fit the inner face of the compression member and has an inner contour adapting it to engage and partially surround the tension bar.

When the assembly is complete, fillers 11 and 12 form a sleeve-like structure engaging that portion of the bar between the inner and outer sides of the brake head and resisting bending of that portion of the bar or, in other words, resisting relative bending between the portion of the bar between the sides of the head and the portion of the bar engaged by tensioning nut 5.

Preferably fillers 11 and 12 have opposing shoulders 13 and 14 respectively. Filler 11 is held against movement longitudinally of the beam by the sides of its pocket 8 in the head and filler 12 is held against movement longitudinally of the beam away from its bar engaging position by the coaction of shoulders 13 and 14.

To assemble the device the fillers may be positioned in the head as indicated in Figure 4, bar 2 then inserted lengthwise to about its normal position in the head, and then filler 12 moved towards the front or shoe mounting face of the head to engage the bar and to permit the insertion end-wise of the end portion of compression member 1, whereupon the parts will be positioned as indicated in Figure 3.

Figures 5 and 6 illustrate a form of the invention in which the compression member 20, the tension member 21 brake head member 22, the tension member 23 and the filler 24 are substantially the same as corresponding parts in Figures 2 and 3 but the other filler 25 seated in the compression member 20 is provided a recess 26 in which a wedge 27 may be inserted to provide a tight engagement between a portion of tension bar 21, spaced from the portion engaged by nut 23, and the parts opposing the same.

Filler 25 includes a shoulder 28 at the inner end of recess 26 and as wedge 27 is driven home its forward end will strike shoulder 28 and be deflected around the back of element 29 to prevent accidental withdrawal of the wedge, although same may be readily removed, when desired, by prying outwardly on its lip 27a.

Figures 7 and 8 illustrate another form of the invention utilizing a single filler 30 seated in the beam compression member 31 and extending substantially half way around the tension bar 32 and engaging the same substantially throughout the distance between the inner and outer sides of the brake head 33 to resist bending of this portion of the tension bar. Brake head 33 and filler 30 have opposing elements 34 and 35 respectively whereby the filler is held against movement longitudinally of the beam away from the tension bar. It will be understood that the filler may be inserted in the brake head, before the insertion of the end of compression member 31, and then moved towards the shoe-mounting face of the head to bring elements 34 and 35 into opposing relations.

Figure 9:
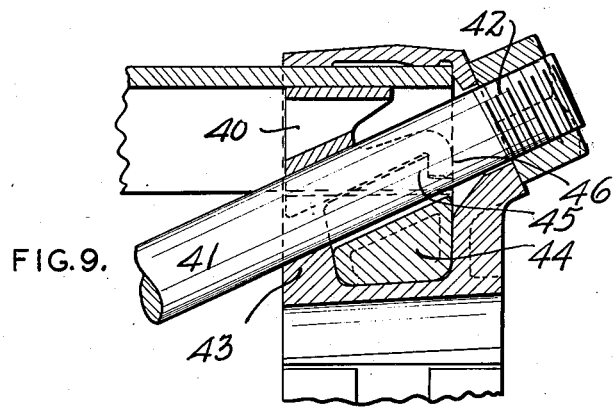

Figure 9 illustrates a form of the invention resembling that shown in Figure 3 but in which the only portion of tension bar 41 contacted by the outer filler 40 is spaced substantially from the threaded portion 42 and opposite to the lug 43 of the brake head. Preferably, but not necessarily, clearance is provided between the bar and the inner filler 44, and the sole function of the latter is to retain outer filler 40 in the head by the interengagement of lugs 45 and 46. Elements 40 and 43 and compression member 47 cooperate to hold the portion of the bar extending across the brake head against bending movement relative to the threaded portion engaged by nut 48.

Figures 10 and 11 illustrate a form of the invention involving a single filler 50 seated against the inner face of the compression member 51 and including a sleeve-like portion 52 surrounding the tension bar 53 intermediate the strut and nut sides of the brake head 54. The portion of the filler farthest from the compression member of the beam projects into the recess 55 in the head and is opposed by head lug 56 to prevent disassembly of the filler.

This single filler may be applied to a standard A. A. R. brake head without any widening of the rod opening in the strut side of the head, as indicated in Figure 8, or the provision of additional filler retaining lugs, as indicated at 34 in Figures 7 and 8.

Each form of the invention includes the essential feature of utilizing filler structure to resist bending of the bar intermediate the sides of the head and relative to the threaded nut-engaging portion of the bar. Upon the application of braking forces, the thrust of the ends of the beam towards the wheels is transmitted through the fillers 12, 25, 30, 40 or 50 directly to the side of the bar to avoid bending of the bar between the threaded portion of the bar and the part immediately adjacent thereto.

Each form of the invention contemplates the use of brake heads without modification in the standard contours of the same for receiving hangers and for mounting the brake shoes. Some of the forms are applicable to old heads thereby providing for the use of the invention on old brake beams. If new heads are used they may include the widened openings for the tension bars and the filler retaining lugs as shown at 34 in Figures 7 and 8.

Those skilled in the art may suggest other arrangements of inserts and retaining and wedging elements therefor without departing from the spirit of the invention and the exclusive use of such modifications as come within the scope of the claims is contemplated.

What is claimed is:

1. In a railway brake beam, a compression member, a brake head member thereon, a tension bar extending through said brake head member, a tensioning device operatively engaging the end portion of said tension bar, and separately formed elongated filler structure seated throughout its length against at least one of said members and engaging said tension bar to hold the portion of the latter passing through said brake head member against bending movement relative to the portion thereof engaged by said tensioning device.

2. In a railway brake beam, a compression member, a brake head member thereon, a tension bar extending through said brake head, a tensioning device operatively engaging the end portion of said tension bar, and separately formed fillers seated in said members and cooperating to hold the portion of said tension bar passing through said brake head member against bending movement relative to the portion thereof engaged by said tensioning device.

3. A structure as described in claim 2 which also includes interengaging elements on the fillers and one of said members retaining said fillers against movement longitudinally of the tension bar.

4. In a railway brake beam, a compression member, a brake head member thereon, a tension bar extending through said brake head member, a tensioning device operatively engaging the end portion of said tension bar, and separately formed fillers seated in said compression member and said brake head member respectively and engaging opposite sides of said tension bar to hold the portion of said tension bar passing through said brake head member against bending movement relative to the portion thereof engaged by said tensioning device.

5. In a railway brake beam, a compression member, a brake head member thereon, a tension bar extending through said brake head member, a tensioning device operatively engaging the end portion of said tension bar, and separately formed fillers seated in said members and forming sleeve-like structure about said tension bar, between the inner and outer sides of said brake head member, to hold said tension bar against bending between said sides.

6. In a railway brake beam, a compression member, a brake head member thereon having a pocket spaced from and opening towards said compression member, a tension bar extending through said brake head member and across the open side of said pocket, a tensioning device seated on the outer side of said brake head member and operatively engaging the end portion of said tension bar, and a separately formed filler seated in said pocket and bearing against the side of said tension bar to resist bending of said bar between the sides of said brake head member.

7. In a railway brake beam, a compression member, a brake head member thereon, a tension bar extending through said brake head member, a tensioning device operatively engaging the end portion of said tension bar, and a separately formed filler seated in said compression member and opposing one side of said tension bar, another separately formed filler seated in said brake head member and opposing the other side of said tension bar, said fillers cooperating to prevent relative bending of the portion of said bar opposed by said fillers and the portion of said bar engaged by said tensioning device.

8. In a railway brake beam, a compression member, a brake head member thereon having a pocket opening towards said compression member, a tension bar extending through said brake head member, a tensioning device operatively engaging the end portion of said tension bar, a filler having an outer contour adapting it to fit in said pocket and having an inner contour adapting it to partially surround said tension bar, and means holding said bar and said filler against each other to resist bending of the portion of said bar engaged by said filler.

9. In a railway brake beam, a compression member of channel-like section, a brake head member thereon, a tension bar extending through said brake head member, a tensioning device operatively engaging the end portion of said tension bar, and a filler having an outer contour adapting it to fit the inner face of said compression member and having an inner contour adapting it to partially surround said tension bar, and means holding said bar and said filler against each other to resist bending of the portion of said bar engaged by said filler.

10. In a railway brake beam, a compression member of channel-like section, a brake head member thereon having a pocket, said channel-like section and pocket facing towards each other, a tension bar extending through said brake head member and across the open side of said pocket, a tensioning device seated on the outer side of said brake head member and operatively engaging the end portion of said tension bar, a filler seated in said channel-like section, and a separate filler seated in said pocket, said fillers having outer contours adapting them to fit the inner face of said compression member and said pocket respectively, and having inner contours cooperating to form a sleeve-like structure about said tension bar, and means thrusting said fillers towards each other to engage said bar and resist the bending of the portion of said bar engaged by said fillers.

11. In a railway brake beam, a compression member, a brake head member thereon having a pocket spaced from and opening towards said compression member, a tension bar extending through said brake head member and across the open side of said pocket, a tensioning device seated on the outer side of said brake head member and operatively engaging the end portion of said tension bar, a separately formed filler seated in said pocket and opposing the side of said tension bar, and wedge means between said compression member and the other side of said tension bar cooperating with said filler to grip said tension bar to said head and to resist the bending of said bar between the sides of said head.

12. A structure as described in claim 2 which also includes a wedge inserted between the tension bar and one of the fillers for tightly gripping the adjacent portion of said bar.

13. A structure as described in claim 2 in which one of the fillers has a recess adjacent to the tension bar, there being a wedge insertable in said recess to provide a tight grip on said tension bar.

14. A structure as described in claim 2 in which one of the fillers has a recess adjacent the tension bar and a shoulder at the inner end of said recess, there being a wedge insertable in said recess to provide a tight grip on said tension bar, the forward end of said wedge being disposed to strike said shoulder and to be distorted thereby to hold the wedge against accidental removal from said recess.

15. In a railway brake beam, a compression member of channel-like section, a brake head member thereon, a tension bar extending through said brake head member, a tensioning device operatively engaging the end portion of said tension bar, and a filler seated in said compression member and opposing the portion of said tension bar between the inner and outer sides of said head to resist bending of said bar portion relative to the portion engaged by said device, there being interengaging elements on said filler and said head member to prevent withdrawal of said filler from said members.

16. In a railway brake beam, a compression member, a brake head member thereon, a tension bar extending through said brake head member, a tensioning device seated on said brake head member and operatively engaging the end portion of said tension bar, and separately formed fillers seated in said compression member and said brake head member respectively and engaging opposite sides of said tension bar at points adjacent the side of said brake head member opposite the seat for said tensioning device.

17. In a railway brake beam, a compression member, a brake head member thereon, a tension bar extending through said brake head member, a tensioning device operatively engaging the end portion of said tension bar, and separately formed filler structure seated in at least one of said members and extending between the inner and outer side walls of the brake head member and throughout its length being seated against the brake head member and engaging the tension bar to hold the portion of the tension bar passing through said brake head member against bending movement relative to the portion thereof engaged by said tensioning device.

18. In a railway brake beam, a compression member, a brake head member thereon, a tension bar extending through said brake head, a tensioning device operatively engaging the end portion of said tension bar, and separately formed fillers seated in said members and engaging said tension bar for the full width of the inside of said brake head member to hold the portion of the tension bar passing through said brake head member against bending movement relative to the portion thereof engaged by said tensioning device.

19. In a railway brake beam, a compression member, a brake head member thereon, a tension bar extending through said brake head member, a tensioning device operatively engaging the end portion of said tension bar, and a separately formed filler seated throughout its length in one of said members and surrounding the portion of said tension bar intermediate the sides of said brake head to hold said intermediate portion against bending movement relative to the portion of the bar engaged by said tensioning device.

20. In a railway brake beam, a compression member, a brake head member thereon having a pocket spaced from and opening towards said compression member, a tension bar extending through said brake head member and across the open side of said pocket, a tensioning device seated on the outer side of said brake head member and operatively engaging the end portion of said tension bar, and a separately formed filler seated in said compression member and having a sleeve-like part projecting into said brake head member pocket and surrounding the portion of said tension bar intermediate the sides of said brake head member to resist bending of said bar portion relative to said bar end portion, the side wall of said pocket opposing an end of said sleeve-like part to prevent sliding of said filler along said bar.

CLARENCE W. OSNER.
HERBERT W. EKHOLM.